United States Patent [19]
Kojima et al.

[11] Patent Number: 6,001,193
[45] Date of Patent: Dec. 14, 1999

[54] HARD MAGNETIC ALLOY COMPACT AND METHOD OF PRODUCING THE SAME

[75] Inventors: Akinori Kojima; Takao Mizushima; Akihiro Makino, all of Niigata-ken; Akihisa Inoue, 11-806 Kawauchijutaku, 35 Motohasekura, Kawauchi, Aoba-ku, Sendai-shi, Miyagi-ken; Tsuyoshi Masumoto, 3-8-22 Kamisugi, Aoba-ku, Sendai-shi, Miyagi-ken, all of Japan

[73] Assignees: Alps Electric Co., Ltd., Tokyo; Akihisa Inoue; Tsuyoshi Masumoto, both of Miyagi, Japan

[21] Appl. No.: 08/827,322

[22] Filed: Mar. 25, 1997

[30] Foreign Application Priority Data

Mar. 25, 1996 [JP] Japan ................................ 8-068820
Sep. 19, 1996 [JP] Japan ................................ 8-248381

[51] Int. Cl.$^6$ ............................ H01F 1/057; H01F 1/03
[52] U.S. Cl. ...................... 148/101; 148/103; 148/104; 419/12
[58] Field of Search .................... 148/101, 102, 148/103, 104; 419/12

[56] References Cited

U.S. PATENT DOCUMENTS

| | | | |
|---|---|---|---|
| 4,966,633 | 10/1990 | Brewer | 148/101 |
| 5,089,065 | 2/1992 | Hamano et al. | 148/302 |
| 5,211,766 | 5/1993 | Panchanathan | 148/101 |
| 5,486,240 | 1/1996 | McCallum | 148/102 |

FOREIGN PATENT DOCUMENTS 0 657 899 A1  6/1995  European Pat. Off. .
WO 92/15995  9/1992  WIPO .

OTHER PUBLICATIONS

"Magnetic properties of novel resin–bonded exchange coupled rare–earth magnets," L. Folks et al., 8405 Journal of Magnetism and Magnetic Materials 147 (1995) Jun., No. 3, Amsterdam, NL.

*Primary Examiner*—John Sheehan
*Attorney, Agent, or Firm*—Brinks Hofer Gilson & Lione

[57] ABSTRACT

A method of producing a hard magnetic alloy compact at low cost, in which an alloy that contains not less than 50% by weight of an amorphous phase and exhibits hard magnetism in a crystallized state is solidified and molded at around its crystallization temperature under applied pressure by utilizing the softening phenomenon occurring during a crystallization process. The resulting compact has high hard magnetic characteristics and can be applied as permanent magnet members such as in motors, actuators, and speakers.

27 Claims, 16 Drawing Sheets

HARD MAGNETIC ALLOY COMPACT AND METHOD OF PRODUCING THE SAME

BACKGROUND OF THE INVENTION

1. Field of the Invention

The present invention relates to a hard magnetic alloy compact and a method of producing such compact, which compact is excellent in magnetic characteristics so that it is applicable to motors, actuators, speakers, and the like.

2. Description of the Related Art

In general, sintered Fe—Nd—B magnets, quenched Fe—Nd—B magnets, and the like are known as magnetic materials superior to ferrite magnets. In addition, new types of alloy magnets such as Fe—Sm—N magnets have been investigated for achieving more superior characteristics.

However, production costs of these magnetic materials are higher than that of the ferrite magnets, since they must contain 10 atomic % of Nd or 8 atomic % of Sm, in other words, large quantities of expensive rare earth elements are necessary.

Meanwhile, although the production cost of ferrite magnets is low, they have insufficient magnetic characteristics.

Therefore, a low-cost magnetic material having superior hard magnetic characteristics to those of ferrite magnets is in demand.

In general, to form a magnetic material powder into a certain shape, the powder is mixed with a binder such as rubber or plastic and subjected to compression molding or injection molding. Magnets produced by such methods are known as bond magnets and are widely used in electronic parts and the like because the magnets can be molded into various shapes. However, the magnetic characteristics of such bond magnets are disadvantageously lower than those of sintered magnets and the like, since the relative density of magnetic material in the magnet is reduced by the existence of binders.

SUMMARY OF THE INVENTION

Given the above-described problems, the first aspect of the present invention provides a method of producing a hard magnetic alloy compact having a step of solidifying and molding an alloy using a softening phenomenon occurring during crystallization, which alloy contains an amorphous phase exhibiting hard magnetism in a crystallized state.

The second aspect of the present invention provides a method of producing a hard magnetic alloy compact having a step of solidifying and molding an alloy by hot-pressing conducted at around the crystallization temperature thereof, which alloy contains not less than 50% by weight of an amorphous phase and exhibits hard magnetism in a crystallized state. Furthermore, the present invention provides a method of producing a hard magnetic alloy compact having a step of solidifying and molding an alloy simultaneously during crystallization, which alloy contains not less than 50% by weight of an amorphous phase and exhibits hard magnetism in a crystallized state.

The third aspect of the present invention provides a method of producing a hard magnetic alloy compact according to the above methods, in which the alloy has the following composition:

$$T_{100-a-b-c}R_aM_bB_c$$

wherein T is at least one element selected from the group consisting of Fe, Co, and Ni; R is at least one element selected from the rare earth elements; M is at least one element selected from the group consisting of Ti, Zr, Hf, V, Nb, Ta, Mo, and W; B is boron; $4 \leq a \leq 20$; $0 \leq b \leq 10$; and $2 \leq c \leq 20$.

The fourth aspect of the present invention provides a method of producing a hard magnetic alloy compact, in which a compact prepared according to the above methods is heat-treated for forming a crystalline phase.

The fifth aspect of the present invention provides a method of producing a hard magnetic alloy compact according to the above methods, in which not less than 60% by weight of the compact is in a fine crystalline phase having an average grain size of not more than 100 nm with the rest of the compact in an amorphous phase, and at least a bcc-Fe phase and a $Fe_{14}R_2B$ phase (wherein R is at least one of rare earth elements) are formed in the fine crystalline phase.

The sixth aspect of the present invention provides a method of producing a hard magnetic alloy compact according to the above methods, in which the remanent magnetization of the compact after solidification and molding is not less than 100 emu/g.

The seventh aspect of the present invention provides a method of producing a hard magnetic alloy compact according to the above methods, in which the ratio of the remanent magnetization to the saturation magnetization of the compact after solidification and molding is not less than 0.7.

According to a method of producing a hard magnetic alloy compact of the present invention, the softening phenomenon occurring during crystallization process is fundamentally used for solidifying and molding an alloy containing an amorphous phase and exhibiting hard magnetism in a crystallized state. Therefore, a hard magnetic alloy compact having excellent hard magnetic characteristics can be prepared without using a binder. Moreover, the hard magnetic alloy compact can be formed into various shapes.

In addition, according to another method of producing a hard magnetic alloy compact of the present invention, an alloy containing 50% by weight of amorphous phase and exhibiting hard magnetism in a crystallized state is solidified and molded without using a binder by hot-pressing conducted at around the crystallization temperature. Thus, the resulting hard magnetic alloy compact is dense and strong with a high relative density. Moreover, the hard magnetic alloy compact has excellent hard magnetic characteristics and can be formed into various shapes.

When an alloy powder containing 50% by weight of amorphous phase and exhibiting hard magnetism in a crystallized state is solidified and molded during crystallization process, the resulting hard magnetic alloy compact have higher relative density as compared with those sintered after crystallization. Moreover, when the relative density of the molded compact is set to 90% or more according to the above methods, a small-size strong permanent magnet can be prepared from the resulting dense and strong compact.

A permanent magnet with strong hard magnetic characteristics can be obtained using an alloy having the following composition:

$$T_{100-a-b-c}R_aM_bB_c \hspace{2em} \text{Formula (1)}$$

In particular, a permanent magnet with extremely high hard magnetic characteristics can be produced when the R is at least one of Pr or Nd.

According to a method of producing a hard magnetic alloy compact of the present invention, a permanent magnet with extremely high hard magnetic characteristics can be obtained when not less than 60% by weight of the compact is in a fine crystalline phase having an average grain size of not more than 100 nm with the rest of the compact in an amorphous phase, and at least a bcc-Fe phase and a $Fe_{14}R_2B$ phase are formed in the fine crystalline phase.

According to another method of producing a hard magnetic alloy compact of the present invention, a permanent magnet with extremely high hard magnetic characteristics can be obtained when the remanent magnetization of the compact after solidification and molding is not less than 100 emu/g and/or the ratio of the remanent magnetization to the saturation magnetization of the compact after solidification and molding is not less than 0.7.

A hard magnetic alloy compact of the present invention contains a lower quantity of rare earth elements as compared with conventional rare earth magnets and has superior hard magnetic characteristics. Thus, a high performance hard magnetic material can be produced at relatively low production cost. Since such a hard magnetic material is useful in permanent magnets in various apparatuses such as motors, actuators, and speakers, lower production cost is achievable in electronics, or electrical machinery and apparatus.

DESCRIPTION OF THE PREFERRED EMBODIMENTS

Figure 1:
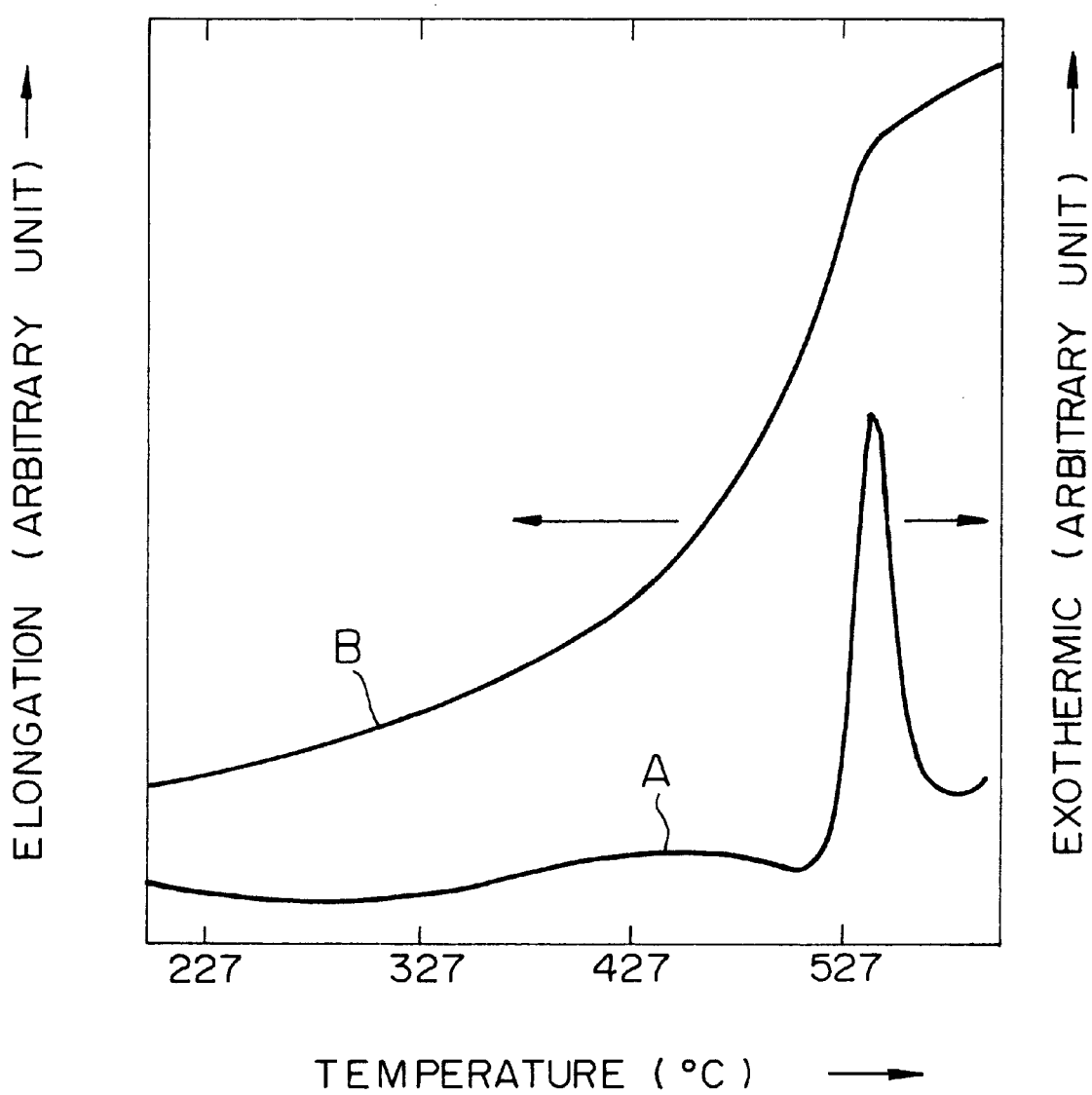
FIG. 1 shows a Differential Scanning Calorimeteric (DSC) curve (A) and a Thermo Mechanical Analysis (TMA) curve (B) for an amorphous alloy of the present invention.

The present invention will be described in detail with reference to the drawings.

The hard magnetic alloy compact (hereinafter referred to as "compact") of the present invention is fundamentally produced by solidifying and molding a powder or ribbon of an alloy (hereinafter referred to as "amorphous alloy"), which has an amorphous phase and which exhibits hard magnetism in a crystallized state, by utilizing the softening phenomenon occurring during a crystallization process of the amorphous phase.

It is revealed that the above mentioned softening phenomenon remarkably appears when the amorphous phase is heated to or near its crystallization temperature. In the softening phenomenon, amorphous-alloy grains are compressed to bind to each other and form one body under applied pressure. Therefore, a compact of the present invention can be produced by heating an amorphous alloy to or near its crystallization temperature and pressing the alloy in a mold or the like. Furthermore, a compact can be produced such that an amorphous alloy maintained at its crystallization temperature is solidified and formed by pressing or the like conducted when it starts crystallization. When a compact is solidified and molded by hot pressing, firm binding can be obtained by employing an amorphous alloy having 50% or more, preferably 80% or more, and more preferably almost 100% by weight (hereinafter referred to as "wt %") of amorphous phase, resulting in a permanent magnet having excellent hard magnetism.

The following method is a practical example for producing a compact of the present invention: an alloy having hard magnetism in a crystallized state is melted and then quenched to obtain an amorphous ribbon or granules. The resulting ribbon or granules are pulverized to a powder having a grain size of, for example, 50 μm to 150 μm. The powder is packed in a mold, preferably a metal mold, heated to or near the crystallization temperature of the amorphous alloy under pressure, then solidified and molded by hot-pressing conducted for a predetermined time. The alloy may be crystallized during or after the solidification and molding process.

When an alloy powder is solidified and molded during the softening phenomenon, it is preferred that the relative density of compact is set to 90% or more by controlling pressure, temperature, molding time, and the like. A strong sintered compact with an extremely dense structure can thereby be obtained, resulting in a strong small-size permanent magnet with excellent hard magnetism.

When an alloy powder is solidified and molded, a crystalline phase is formed in the resulting compact by heat treatment conducted during or after the solidification and molding. The compact thereby attains hard magnetic characteristics. In particular, a compact having extremely high hard magnetic characteristics can be prepared when 60 wt % or more of the molded body is a fine crystalline phase having an average grain size of 100 nm or less and the rest of the molded body is an amorphous phase, and the bcc-Fe and $Fe_{14}R_2B$ phases (wherein R is at least one of rare earth elements) are formed in the fine crystalline phase.

The compact prepared by the above method can be used as a strong permanent magnet having remanent magnetization (Ir) of 100 emu/g or more and a remanence ratio (Ir/Is), that is, a ratio of remanent magnetization (Ir) to saturation magnetization (Is), of 0.7 or more.

Amorphous alloys usable for producing compacts of the present invention will be described in detail. Fundamentally, an amorphous alloy having any composition can be used for the present invention, as long as it exhibits a softening phenomenon during crystallization as well as hard magnetic characteristics in a crystallized state.

The inventors of the present invention have investigated amorphous alloy materials having the above characteristics and have found that an alloy of the following formula (1) satisfies the above requirements:

$$T_{100-a-b-c}R_aM_bB_c \qquad \text{Formula (1)}$$

wherein T is at least one element selected from the group consisting of Fe, Co, and Ni; R is at least one element selected from the rare earth elements; M is at least one element selected from the group consisting of Ti, Zr, Hf, V, Nb, Ta, Mo, and W; B is boron; $4 \leq a \leq 20$; $0 \leq b \leq 10$; and $2 \leq c \leq 20$, wherein the ratios (amounts) a, b and c represent atomic %. The term "rare earth element" used here includes Sc, Y, La, Ce, Pr, Nd, Pm, Sm, Eu, Gd, Tb, Dy, Ho, Er, Tm, Yb, and Lu.

In the formula (1), T is at least one element selected from the group consisting of Fe, Co, and Ni. These elements are the main component of the amorphous alloy and are responsible for magnetism. An increase in the composition ratio of T (i. e., 100-a-b-c) of the amorphous alloy results in a rise in the saturation magnetization (Is) of the resulting hard magnetic compact. Fifty atomic % or more of T is required in the composition to achieve high remanent magnetization (Ir) of 100 emu/g or more, and 83 atomic % or more is preferable to obtain further higher remanent magnetization.

In the formula (1), R is at least one element selected from the rare earth elements (i. e., Sc, Y, La, Ce, Pr, Nd, Pm, Sm, Eu, Gd, Tb, Dy, Ho, Er, Tm, Yb, and Lu). The rare earth element R readily forms an amorphous phase. The composition ratio a of the rare earth element is required to be 4 atomic % or more to form a sufficient quantity (i. e., 50 wt % or more) of amorphous phase in an alloy so as to produce a satisfactory quantity of the fine crystalline phase and attain excellent hard magnetic characteristics by crystallizing the amorphous phase.

Meanwhile, the saturation magnetization (Is) of the resulting compact tends to decrease corresponding to an increase in the composition ratio a of the rare earth element R. To obtain high remanent magnetization (Ir), it is necessary to set the composition ratio a of the rare earth element R to 20 atomic % or less. In particular, the preferred value of the composition ratio a of the rare earth element R is not more than 7 atomic %. It was found that further excellent hard magnetic characteristics were achievable when the rare earth element R was entirely or partially composed of Nd and/or Pr.

In the formula (1), M is at least one element selected from the group consisting of Ti, Zr, Hf, V, Nb, Ta, Mo, and W. Although the element M is not essential for producing the compact, a sufficient quantity of amorphous phase can be produced by the addition of the element M, even when the composition ratio of the expensive rare earth element R is low, because the element M is excellent in forming amorphous phases. However, when the composition ratio b (atomic %) is increased by Fe replacement, the saturation magnetization (Is) of the resulting compact correspondingly decreases. Therefore, the preferred range of the composition ratio b of the element M is from 0 to 10 atomic %, in particular, from 0.5 to 3 atomic %.

Boron (B) is added to the composition of formula (1). B also readily forms amorphous phases. For example, when an amorphous phase containing Fe and B is heated to an appropriate temperature range of from 600 to 900° C., a Fe—B compound is formed. The preferred composition ratio c of B is 2 atomic % or more, and particularly 3 atomic % or more, to form a sufficient quantity of amorphous phase in an alloy to produce a satisfactory quantity of fine crystalline phase by crystallizing the amorphous phase. However, when the preferred composition ratio c of B (atomic %) increases excessively, the saturation magnetization (Is), remanent magnetization (Ir), and coercive force (iHc) of the resulting compact tend to decrease. Therefore, the composition ratio c is required to be 20 atomic % or less, and in particular, 7 atomic % or less is preferred to obtain excellent hard magnetic characteristics.

The particularly preferred alloy composition for producing a compact of the present invention is as follows: The element T contains Fe as at least a portion thereof and at least the bcc-Fe and $Fe_{14}R_2B$ phases are formed in a fine crystalline phase produced by heat treatment or the like.

The particularly preferred amorphous alloy examples for producing a compact of the present invention are $Fe_{88}Pr_7B_5$, $Fe_{86}Pr_7Nb_2B_5$, $Fe_{86}Nd_7Zr_2B_5$, $Fe_{86}Nd_9B_5$, $Fe_{84}Pr_{11}B_5$, $F_{88}Pr_5Nb_2B_5$, $Fe_{88}Nd_5Nb_2B_5$, $Fe_{86}Nd_7Nb_2B_5$, and $Fe_{89}Pr_4Nb_2B_5$. Using these alloys, strong compacts are formed by hot press treatment and the bcc-Fe and $Fe_{14}R_2B$ phases are formed in the resulting fine crystalline phase, thereby providing permanent magnets with excellent magnetic characteristics.

An amorphous alloy which contains an amorphous phase and which is used for producing a compact can generally be prepared by melting and quenching the alloy composition. Examples of a quenching methods include: a method of quenching an alloy composition by blowing a molten metal of the alloy composition on a rotating drum to form a ribbon therefrom; and a method of quenching an alloy composition by jetting a molten metal of the alloy composition as droplets in a cooling gas to form a powder therefrom. The amorphous alloys used for the present invention may be prepared from any of these methods.

EXAMPLES

The present invention will be explained in detail in the following examples.

Amorphous Alloy Preparation

Amorphous alloys of various compositions shown in Table 1 were prepared according to the following procedure: Alloy ingots each having compositions shown in Table 1 were prepared by arc melting. Each molten metal from these alloys was blown onto the surface of a rotating Cu roll in an Ar atmosphere to obtain quenched ribbon approximately 20 μm thick. The resulting quenched ribbon was pulverized to an amorphous alloy powder having a grain size of 50 to 150 μm by a rotor speed mill.

Compact Production

The crystallization temperature Tx (°C.) of each amorphous alloy powder was measured by the X-ray diffraction method. The powders were then packed into the corresponding molds and sintered at 600 MPa for 8 min. at various sintering temperatures Ts (°C.) to form compacts.

Measurements

The remanent magnetization Ir (T), remanence ratio (Ir/Is), and coercive force iHc (kA/m), as magnetic characteristics, and the relative density (%) of the resulting compacts were measured.

The relative density (%) used here is a value corresponding to the specific density (7.5 g/cm$^3$). The remanent magnetization Ir (T) is defined as follows:

$$Ir(T)=4 \pi \times 7.5 \times \text{relative density} \times Ir \text{ (emu/g)}/10,000$$

The coercive force iHc (kA/m) is defined as follows:

$$iHc(kOe)=80iHc(kA/m)$$

Table 1 shows the results of the crystallization temperature Tx (°C.), sintering temperature Ts (°C.), relative density (%), remanent magnetization Ir (T), remanence ratio (Ir/Is), and coercive force iHc (kA/m).

TABLE 1

| Alloy Composition | Tx (°C.) | Ts (°C.) | Relative Density | Ir (T) | Ir/Is | iHc (*) |
|---|---|---|---|---|---|---|
| $Fe_{88}Pr_7B_5$ | 570 | 450 | 80% | 0.90 | 0.65 | 200 |
| | 570 | 500 | 88% | 0.99 | 0.67 | 198 |
| | 570 | 550 | 94% | 1.05 | 0.64 | 200 |
| | 570 | 600 | 98% | 1.11 | 0.70 | 210 |
| | 570 | 650 | 98% | 1.13 | 0.72 | 207 |
| $Fe_{86}Pr_7Nb_2B_5$ | 600 | 500 | 84% | 0.78 | 0.71 | 250 |
| | 600 | 550 | 93% | 0.87 | 0.73 | 265 |
| | 600 | 600 | 99% | 0.92 | 0.70 | 260 |
| | 600 | 650 | 99% | 0.93 | 0.73 | 270 |
| $Fe_{86}Nd_7Zr_2B_5$ | 600 | 500 | 83% | 0.75 | 0.70 | 270 |
| | 600 | 550 | 88% | 0.79 | 0.64 | 250 |
| | 600 | 600 | 95% | 0.86 | 0.72 | 260 |
| | 600 | 650 | 98% | 0.90 | 0.70 | 264 |
| $Fe_{86}Nb_9B_5$ | 610 | 500 | 80% | 0.69 | 0.65 | 340 |
| | 610 | 550 | 85% | 0.73 | 0.67 | 360 |
| | 610 | 600 | 95% | 0.82 | 0.69 | 360 |
| | 610 | 650 | 98% | 0.86 | 0.70 | 350 |
| $Fe_{84}Pr_{11}B_5$ | 640 | 550 | 80% | 0.69 | 0.70 | 550 |
| | 640 | 600 | 82% | 0.71 | 0.62 | 570 |
| | 640 | 650 | 96% | 0.83 | 0.66 | 570 |
| | 640 | 700 | 98% | 0.76 | 0.67 | 560 |
| $Fe_{88}Pr_5Nb_2B_5$ | 510 | 450 | 85% | 1.05 | 0.80 | 199 |
| | 510 | 500 | 96% | 1.05 | 0.65 | 215 |
| | 510 | 550 | 98% | 1.03 | 0.68 | 220 |
| | 510 | 600 | 99% | 1.10 | 0.66 | 210 |
| $Fe_{88}Nd_5Nb_2B_5$ | 510 | 450 | 89% | 0.98 | 0.65 | 200 |
| | 510 | 500 | 98% | 0.95 | 0.64 | 195 |
| | 510 | 550 | 99% | 1.05 | 0.66 | 216 |
| $Fe_{89}Pr_4Nb_2B_5$ | 490 | 400 | 89% | 1.16 | 0.82 | 145 |
| | 490 | 450 | 96% | 1.25 | 0.89 | 150 |
| | 490 | 500 | 99% | 1.30 | 0.84 | 140 |

* kA/m

It is understood from Table 1 that dense compacts having excellent hard magnetic characteristics are obtained by solidifying and molding amorphous alloys each having the compositions shown in Table 1 according to a method of the present invention.

FIG. 1 shows examples of a Differential Scanning Calorimeteric (DSC) curve and a Thermo Mechanical Analysis (TMA) curve of an amorphous alloy having a composition of $Fe_{88}Nd_5Zr_2B$. These curves were obtained from measurements conducted at a heating rate of 0.17° C./sec. The DSC curve (A) has an exothermic peak at around 527° C., which phenomenon indicates crystallization of bcc-Fe. It is apparent from the TMA curve (B) that sample elongation increases with temperature elevation starting from approximately at 327° C., which temperature is approximately 200° C. lower than the crystallization temperature, indicating that the softening phenomenon of the alloy occurs in the range from approximately 200° C. below the crystallization temperature to approximately the crystallization temperature.

The amorphous alloy powder grains form less porous dense compacts when pressed in the above softening temperature region because softened grains are closely pressed to bind to each other.

Figure 2:
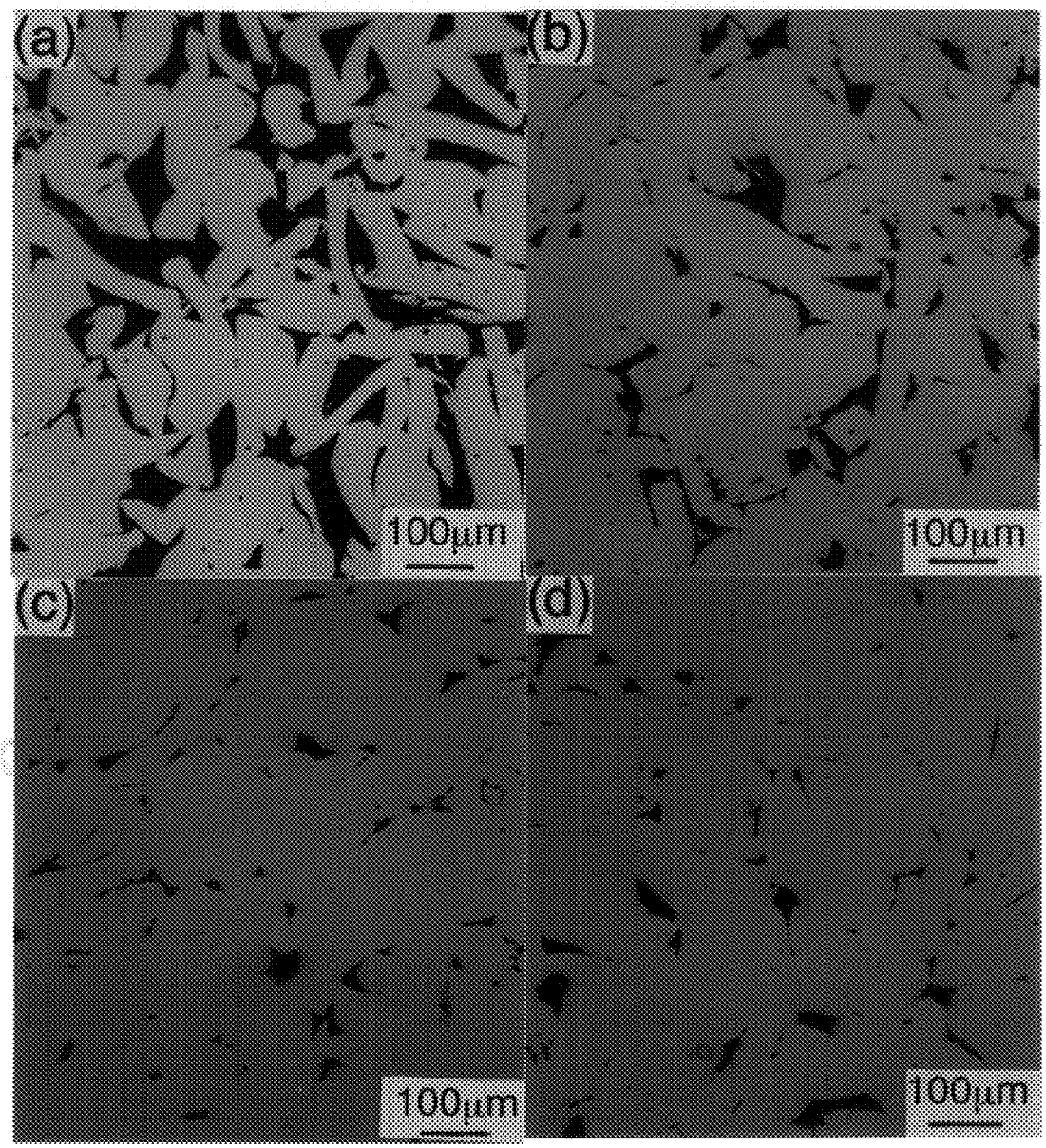
FIGS. 2 are microphotographs showing structures of compact samples prepared by sintering an amorphous alloy of the present invention at progressively increasing temperatures (a), (b), (c), and (d)

FIGS. 2 are microphotographs showing structures of compact samples sintered under a pressure of 600 MPa for 80 min. at various temperatures.

FIG. 2(a) shows a structure of a sample sintered at 400° C., FIG. 2(b) shows a structure of a sample sintered at 450° C., FIG. 2(c) shows a structure of a sample sintered at 500° C., and FIG. 2(d) shows a structure of a sample sintered at 600° C. It is understood from these microphotographs that the resulting compacts become less porous and denser with sintering-temperature elevation and satisfactorily dense compacts are produced when the sintering temperature is 500° C. or more.

The amorphous phase of amorphous alloys at least partially crystallizes when heated to the crystallization temperature.

Figure 3:
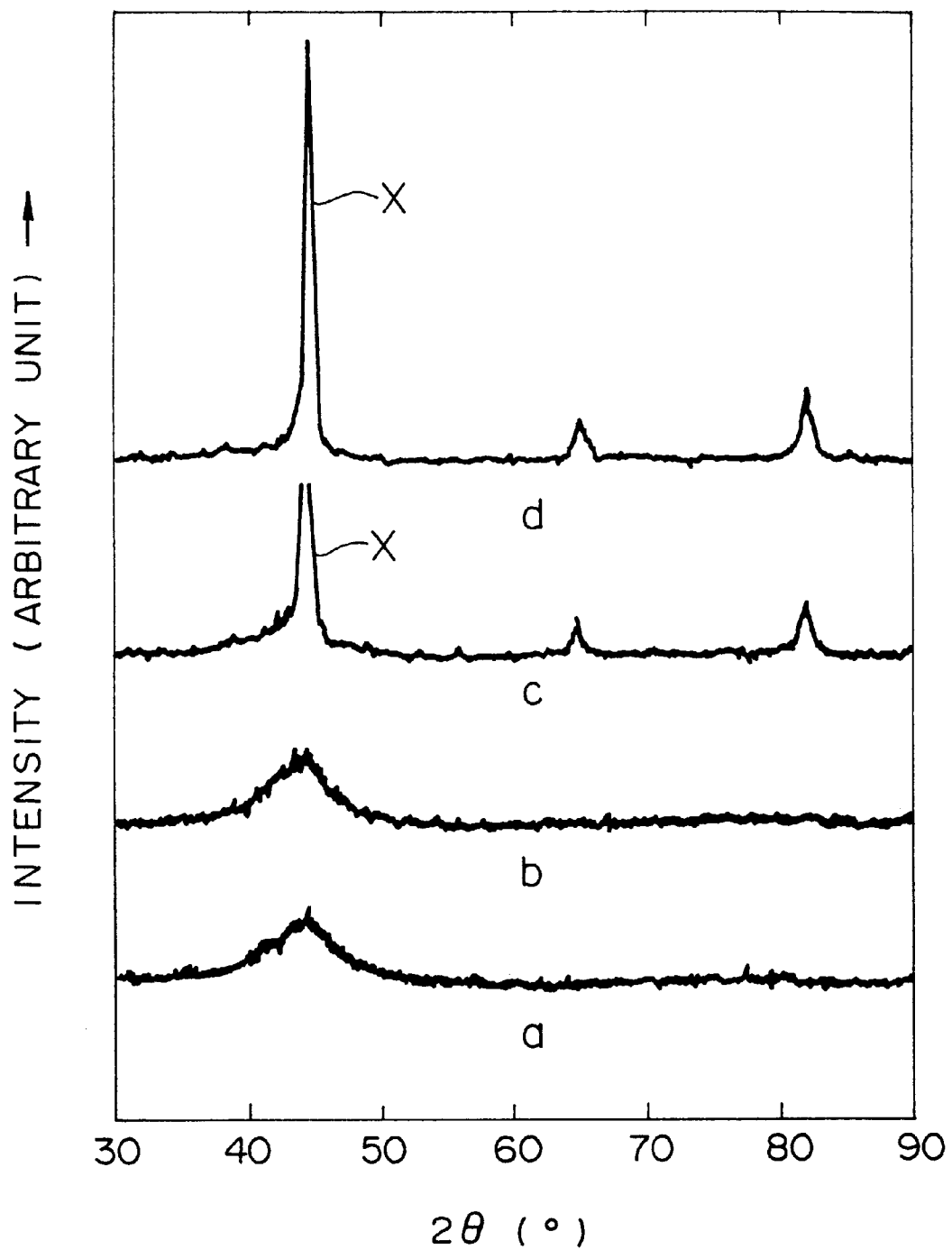
FIG. 3 shows X-ray diffraction patterns of compact samples prepared by sintering an amorphous alloy of the present invention at progressively increasing temperatures (a), (b), (c), and (d)

FIG. 3 shows X-ray diffraction patterns of compact samples measured immediately after sintering under a pressure of 600 MPa for 80 min. at various temperatures.

In FIG. 3, a pattern (a) is obtained from a sample sintered at 400° C., a pattern (b) is obtained from a sample sintered at 450° C., a pattern (c) is obtained from a sample sintered at 500° C., and a pattern (d) is obtained from a sample sintered at 600° C. Halo patterns appearing at around 2θ=44.5° indicate the existence of a bcc-Fe crystalline phase.

It is understood from FIG. 3 that almost no bcc-Fe crystals are produced and halo patterns of an amorphous phase appear in a sintering temperature range of 450° C. or less shown by patterns (a) and (b), while the bcc-Fe crystalline phase is apparently formed with hard magnetic characteristics in a sintering temperature range of between 500 and 600° C. shown by patterns (c) and (d).

Figure 4:
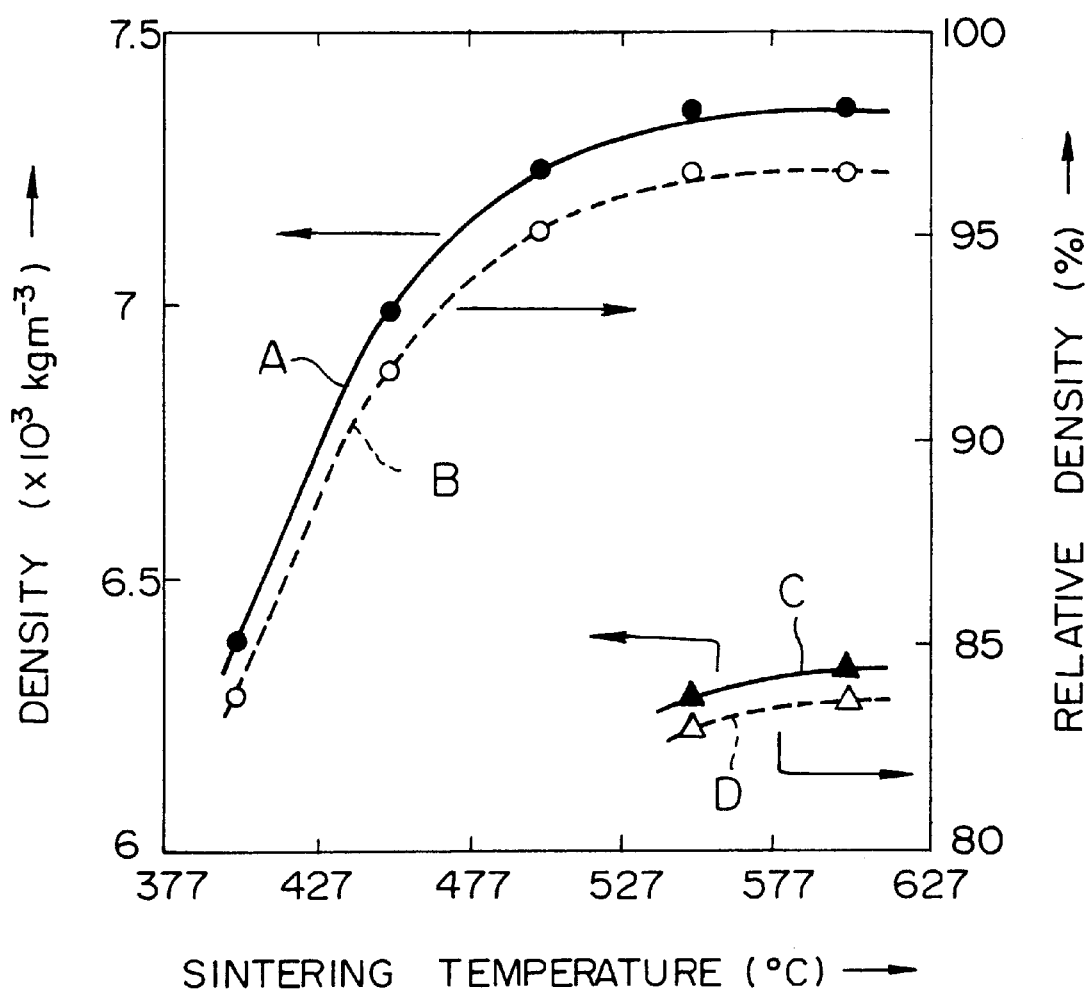
FIG. 4 shows the density (A) and relative density (B) of compact samples of the present invention and the density (C) and relative density (E) of compact samples of a comparative example.

FIG. 4 shows the density (A) and relative density (B) of compact samples sintered under a pressure of 600 MPa for 80 min. at various temperatures. It is understood from FIG. 4 that the density increases with sintering-temperature elevation and the relative density reaches 95% or more when the sintering temperature is 500° C. or more.

A comparison of the above results shown in FIG. 4 and the X-ray diffraction patterns shown in FIG. 3 reveals that when a compact is sintered at 450° C. or less, at which temperature the alloy is still in an amorphous state, the resulting compact exhibits insufficient relative density. Meanwhile, the resulting compact attains a satisfactorily high relative density of 95% or more when the sintering temperature is 500° C. or more, at which temperature the bcc-Fe crystalline phase is formed. Therefore, when compacts are solidified and molded using the softening phenomenon occurring during crystallization, the resulting compacts are satisfactorily densely sintered with excellent physical and hard magnetic characteristics, since crystallization and binding simultaneously occur in one hot-pressing procedure.

FIG. 4 shows the density (C) and relative density (D) of samples prepared as a comparative example according to the following procedure: A powder material was crystallized by heating in a powder state at 600° C. and then annealed for 1 hour. The resulting powder material was solidified and molded by sintering under a pressure of 600 MPa for 80 min. in a temperature range between 550 and 600° C., as is similar to the above example. Samples of the comparative example, in which after being crystallized in a powder state, the powder materials were solidified and molded under the same conditions as the above example, have a relative density of 85% or less. Therefore, it is understood that a satisfactorily dense structure cannot be achieved in the resulting compact when a once crystallized material is solidified and molded.

As is mentioned in the above, compacts of the present invention can be formed into various shapes because they are produced from powders, and moreover, the resulting compacts are dense and hard with excellent hard magnetic characteristics. Therefore the compacts can be advantageously applied as permanent magnet members, such as in motors, actuators, and speakers.

A preferred example of a compact-producing method incorporated in the present invention and the measurement results of the magnetic characteristics of the resulting compacts will be described below, in which method compacts are produced from Fe—Nd—Nb—B alloys by plasma sintering.

Figure 5:
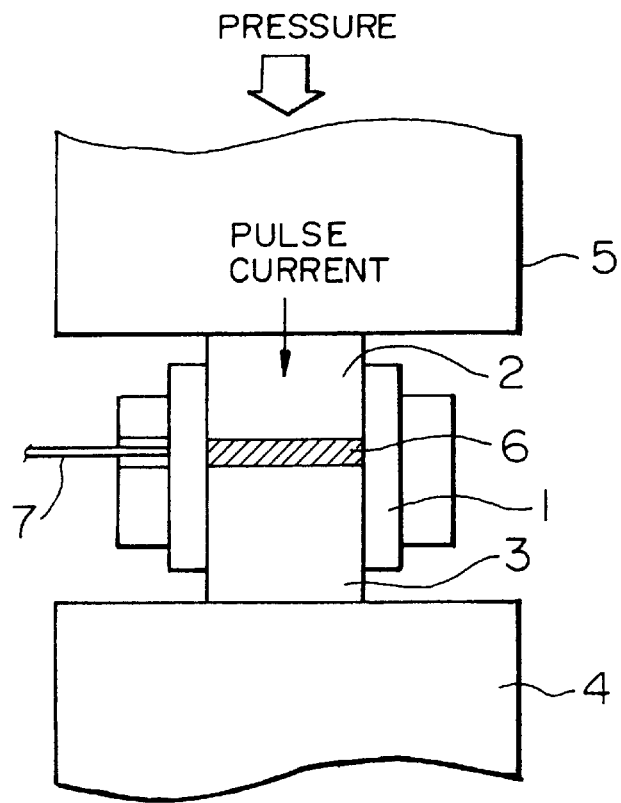
FIG. 5 is a sectional diagram showing a main portion of a plasma sintering apparatus.

As a preferred example, FIG. 5 shows a main portion of a plasma sintering apparatus used for producing compacts of the present invention. The plasma sintering apparatus includes: a cylindrical die 1; an upper punch 2 and a lower punch 3 both inserted into the die 1; a support 4 which supports the lower punch 3 and serves as an electrode when a pulse current mentioned below is applied thereto; a support 5 which presses the upper punch 2 downward and serves as the other electrode when the pulse current is applied; and a thermo-couple 7 which measures the temperature of a powder material 6 sandwiched between the upper and lower punches 2 and 3.

Figure 7:
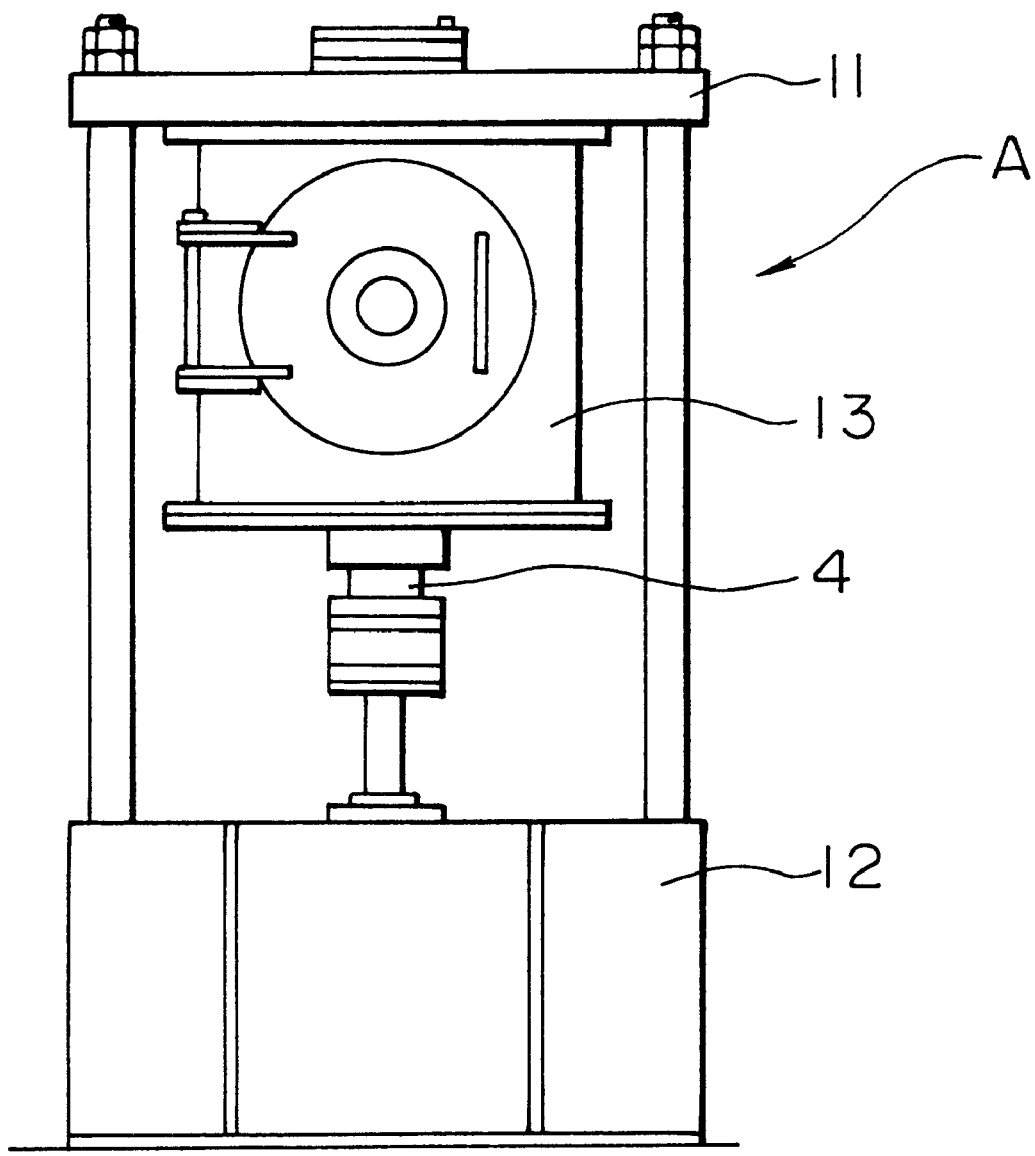
FIG. 7 is a front diagram showing the whole construction of the plasma sintering apparatus shown in FIG. 5.

FIG. 7 shows the whole construction of the plasma sintering apparatus shown in FIG. 5. The plasma sintering apparatus A shown in FIG. 7 is a SPS-2050 model manufactured by Sumitomo Coal Mining Co., LTD. which is a type of spark plasma sintering apparatus.

Figure 6:
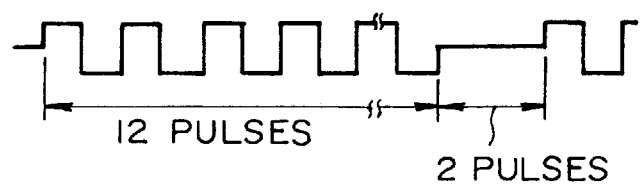
FIG. 6 shows a waveform example of a pulse current applied to a material powder in the plasma sintering apparatus shown in FIG. 5.

The plasma sintering apparatus A includes an upper base 11, a lower base 12, and a chamber 13 positioned adjacent to the upper base 11, in which chamber 13 almost the entire construction shown in FIG. 5 is included. The chamber 13 connects to evacuation equipment and atmospheric gas supplying equipment (both of which are not shown in FIG. 7) so as to maintain a desired atmosphere for the material powder 6 sandwiched between the upper and lower punches 2 and 3. Energizing equipment not shown in FIG. 5 or 7 applies a pulse current, such as shown in FIG. 6, to the powder material 6 via the upper and lower punches 2 and 3 and the bases 4 and 5. A typical pulse current has a period of 2 seconds and an amplitude of 4700 to 4800 A.

According to a plasma sintering method employing such an apparatus, the temperature of a material powder can be rapidly elevated at a predetermined rate and strictly controlled corresponding to the applied current. Therefore, further accurate temperature control is achieved as compared with the use of a heater or the like, resulting in almost ideal sintering conducted in accordance with predetermined conditions.

Preparation of Quenched Amorphous Alloy Ribbons

Amorphous alloys each having the compositions of $Fe_{88}Nd_5Nb_2B_5$ and $Fe_{86}Nd_7Nb_2B_5$ are prepared as follows:

Alloy ingots of each composition were prepared by arc melting. Molten metal from these alloys was blown onto the surface of a rotating Cu roll using a quartz nozzle having a slit size of 0.3×14 mm in an Ar atmosphere so as to obtain a quenched ribbon approximately 20 µm thick. The following quenching conditions were employed:

| | |
|---|---|
| Weight of ingot | 15 to 20 g |
| Vacuum | $6 \times 10^3$ Pa or less |
| Ar atmospheric pressure | 15 cmHg |
| Blowing pressure | 0.4 kgf/cm$^3$ |
| Roll rotating rate | 4,000 rpm |
| Blowing temperature | 1,450° C. |

Although the alloys were not formed into excellent ribbon shapes, it matters little since the resulting ribbons would be pulverized in the next step.

Powder Preparation

The resulting quenched alloy ribbons were pulverized in a rotor speed mill followed by classification. The grain size distributions expressed in weight percentage are shown in FIGS. 8 ($Fe_{86}Nd_7Nb_2B_5$) and 9 ($Fe_{88}Nd_5Nb_2B_5$).

Figure 8:
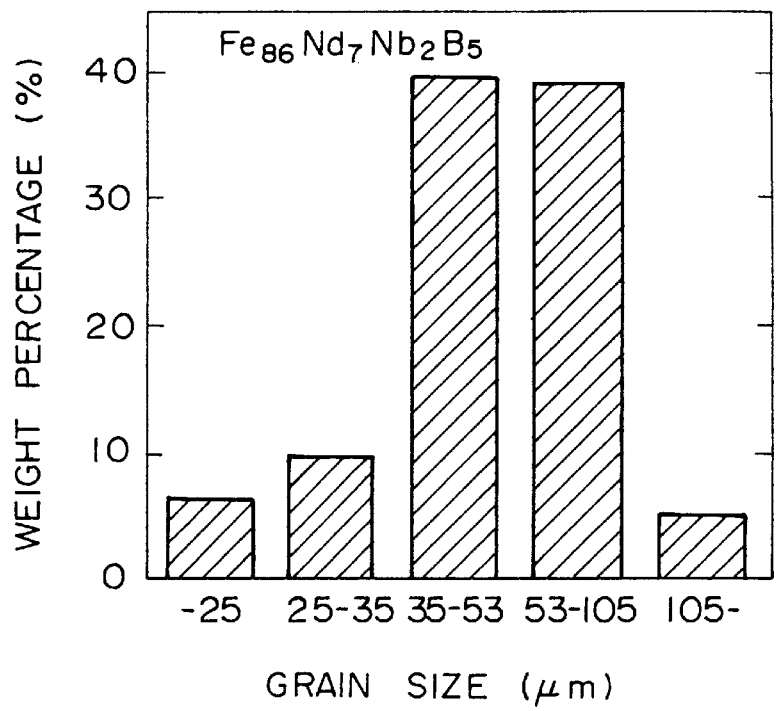
FIG. 8 shows the grain-size distribution of an amorphous alloy powder of the present invention.
Figure 9:
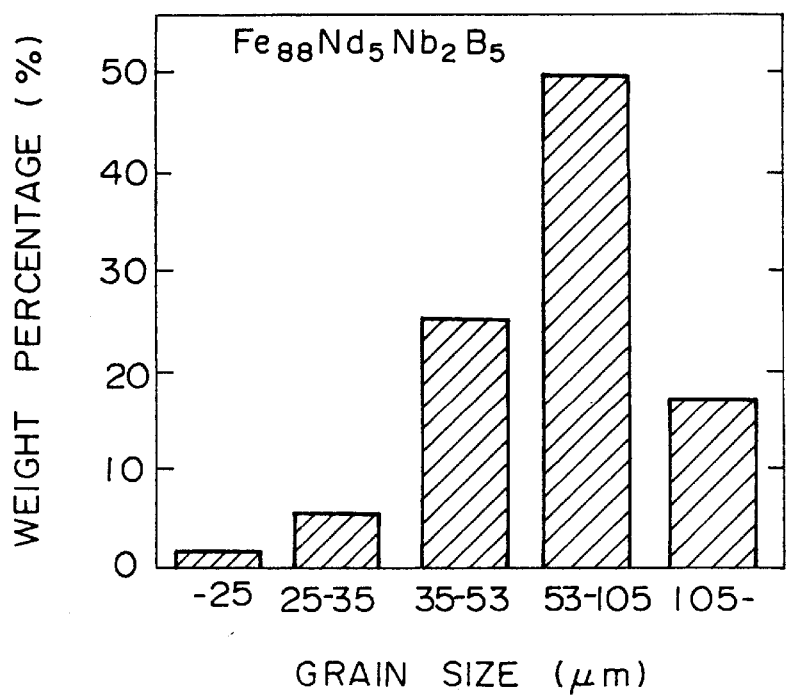
FIG. 9 shows the grain-size distribution of another amorphous alloy powder of the present invention.

It is understood from FIGS. 8 and 9 that each ribbon was mostly pulverized to a grain size of approximately 35 to 105 µm. The most frequent grain size of the powder prepared from the $Fe_{86}Nd_7Nb_2B_5$ alloy was 35 to 53 µm and that of the $Fe_{88}Nd_5Nb_2B_5$ alloy was 53 to 105 µm. Therefore, alloys with a larger Nd component are more brittle and more readily pulverized uniformly as compared with those having a smaller Nd component.

As a comparative example, a ribbon was prepared from a Fe—(Nb, Zr)—B amorphous alloy not containing rare earth element and then pulverized according to a similar procedure as the above. Not more than 10 wt % of the resulting powder had a grain size of 53 to 105 µm.

Therefore, it is revealed that the Fe—Nd—Nb—B amorphous alloys are more readily pulverized as compared with the Fe—(Nb, Zr)—B amorphous alloys.

X-ray Diffraction Patterns of Powders

Figure 10:
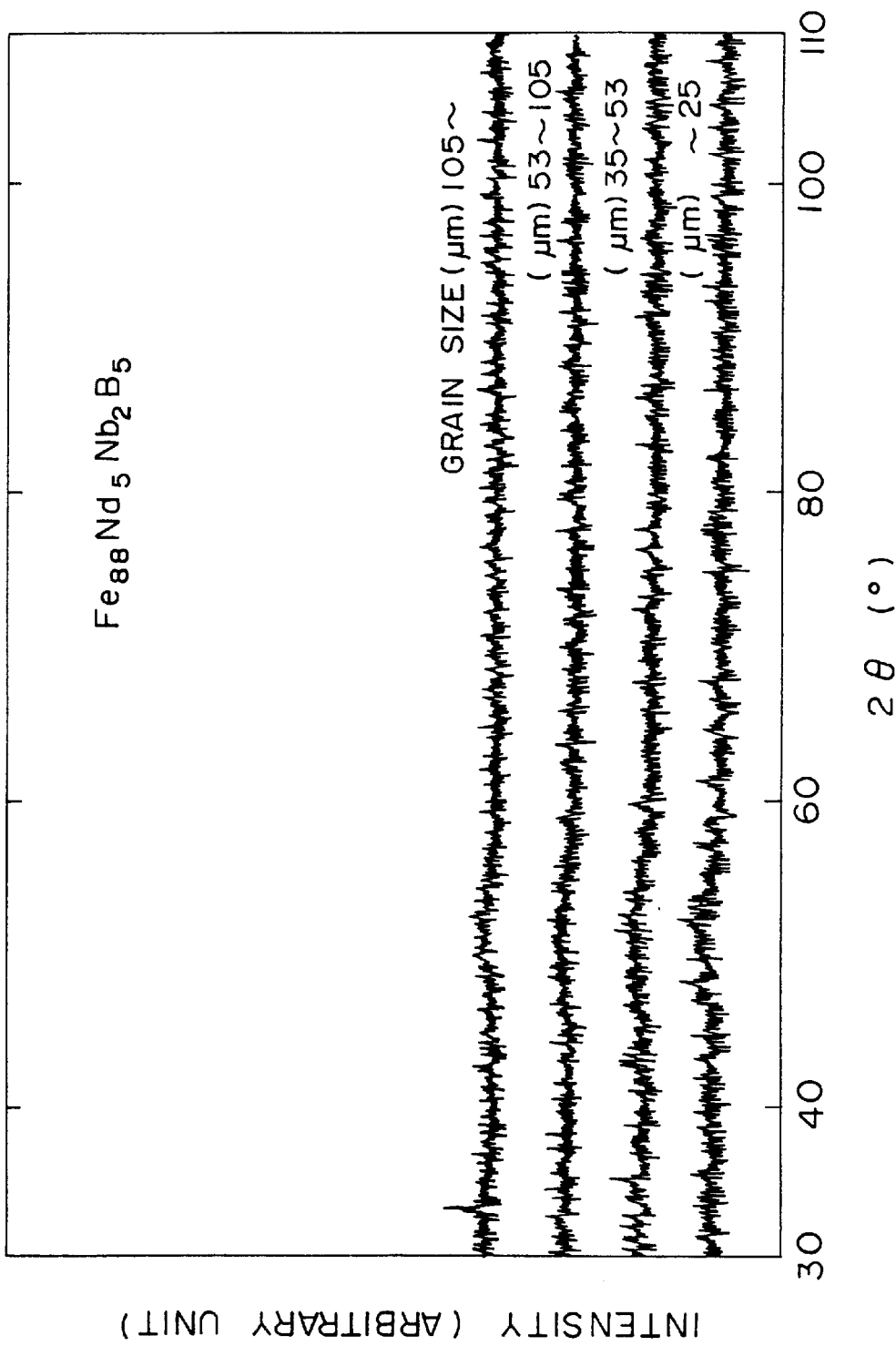
FIG. 10 shows X-ray diffraction patterns of an amorphous alloy powder of the present invention.
Figure 11:
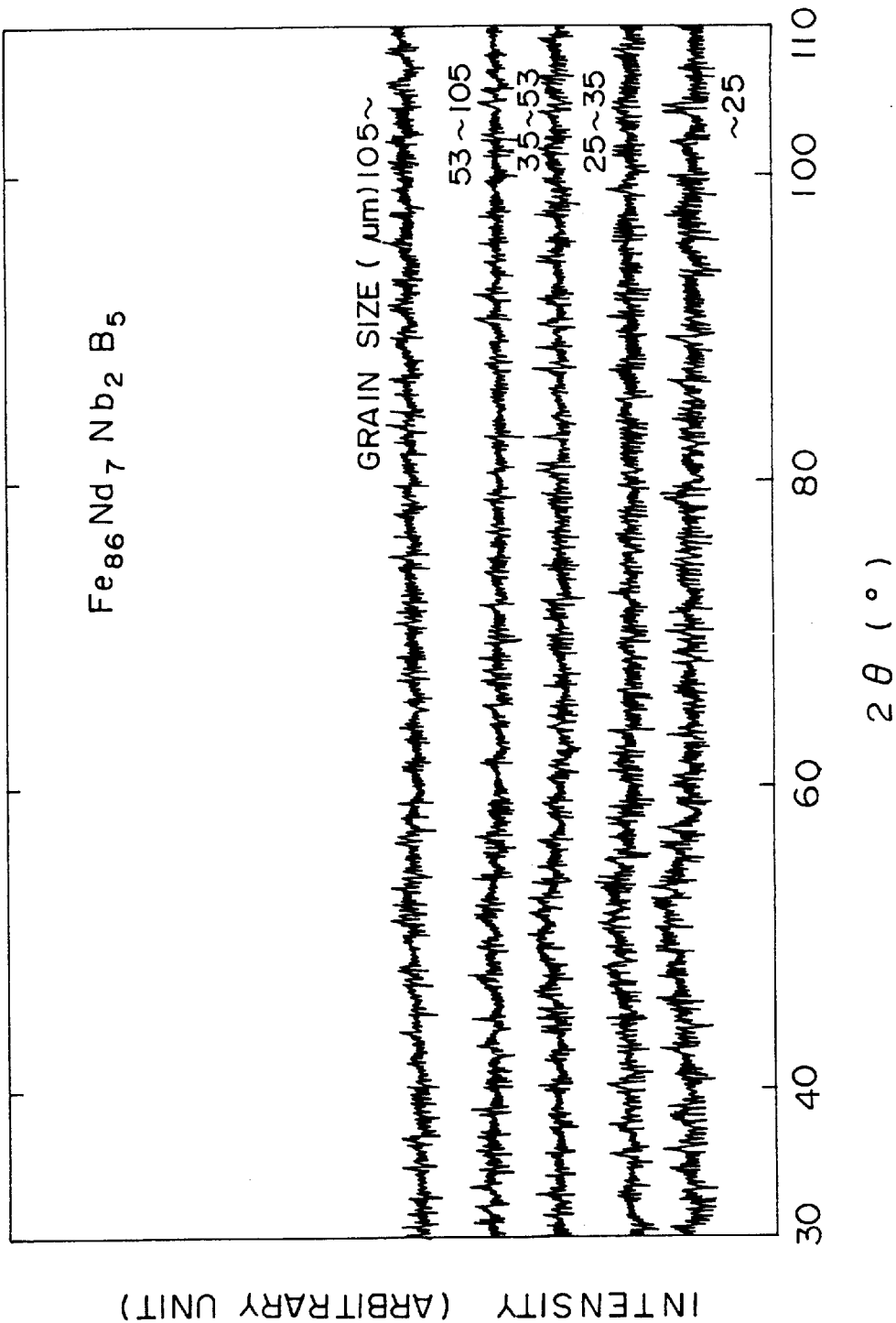
FIG. 11 shows X-ray diffraction patterns of another amorphous alloy powder of the present invention.

FIGS. 10 and 11 show X-ray diffraction patterns according to grain sizes of the pulverized $Fe_{88}Nd_5Nb_2B_5$ and $Fe_{86}Nd_7Nb_2B_5$ alloy powders, respectively.

Each pattern has a broad diffraction peak at around 2θ=50°, indicating an amorphous-phase formation in each powder.

As a comparative example, a ribbon was prepared from an $Fe_{84}Nb_7B_9$ amorphous alloy not containing rare earth elements and then pulverized. Among the X-ray diffraction patterns of the resulting powder, the pattern corresponding to a grain size of 25 to 53 µm had a peak indicating a crystalline phase. This peak is attributed to the crystallization occurring during the pulverizing procedure or contamination from the pulverizing apparatus.

Accordingly, it is found that Fe—Nd—Nb—B amorphous alloys are advantageous in that they are readily pulverized into fine powders while maintaining the amorphous phase thereof.

Compact Preparation

A $Fe_{88}NdSNb_2B_5$ alloy powder and a $Fe_{86}Nd_7Nb_2B_5$ alloy powder both having a grain size of from 53 to 105 µm were packed into the corresponding molds and subjected to plasma sintering to form compacts. Sintering was conducted under 663 MPa at a sintering temperature of 550° C. with an heating rate of 16.7° C./sec and a holding time of 480 sec (8 min.).

Figure 12:
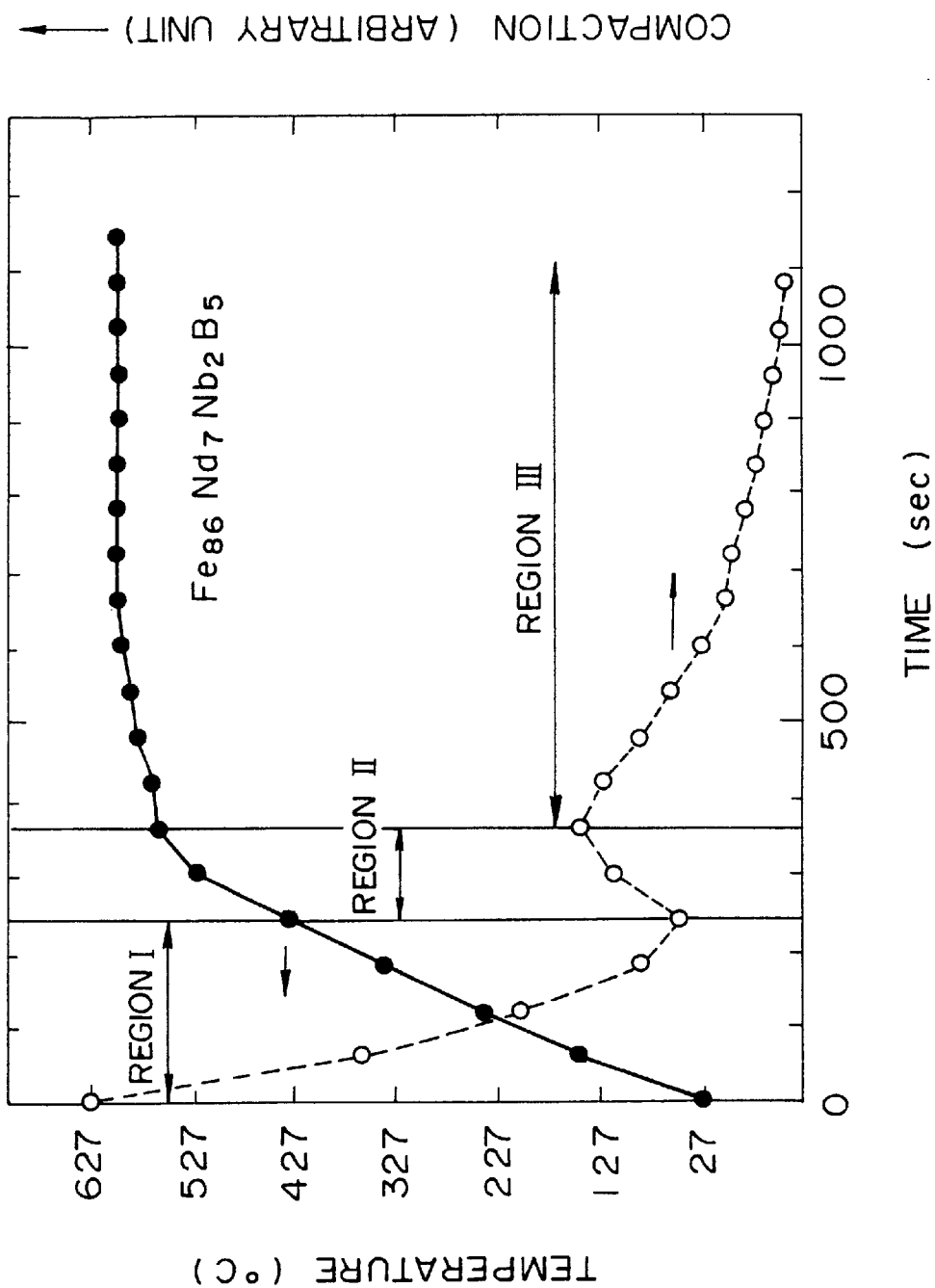
FIG. 12 shows changes in temperature and compaction of compact samples of the present invention with time elapse during sintering.
Figure 13:
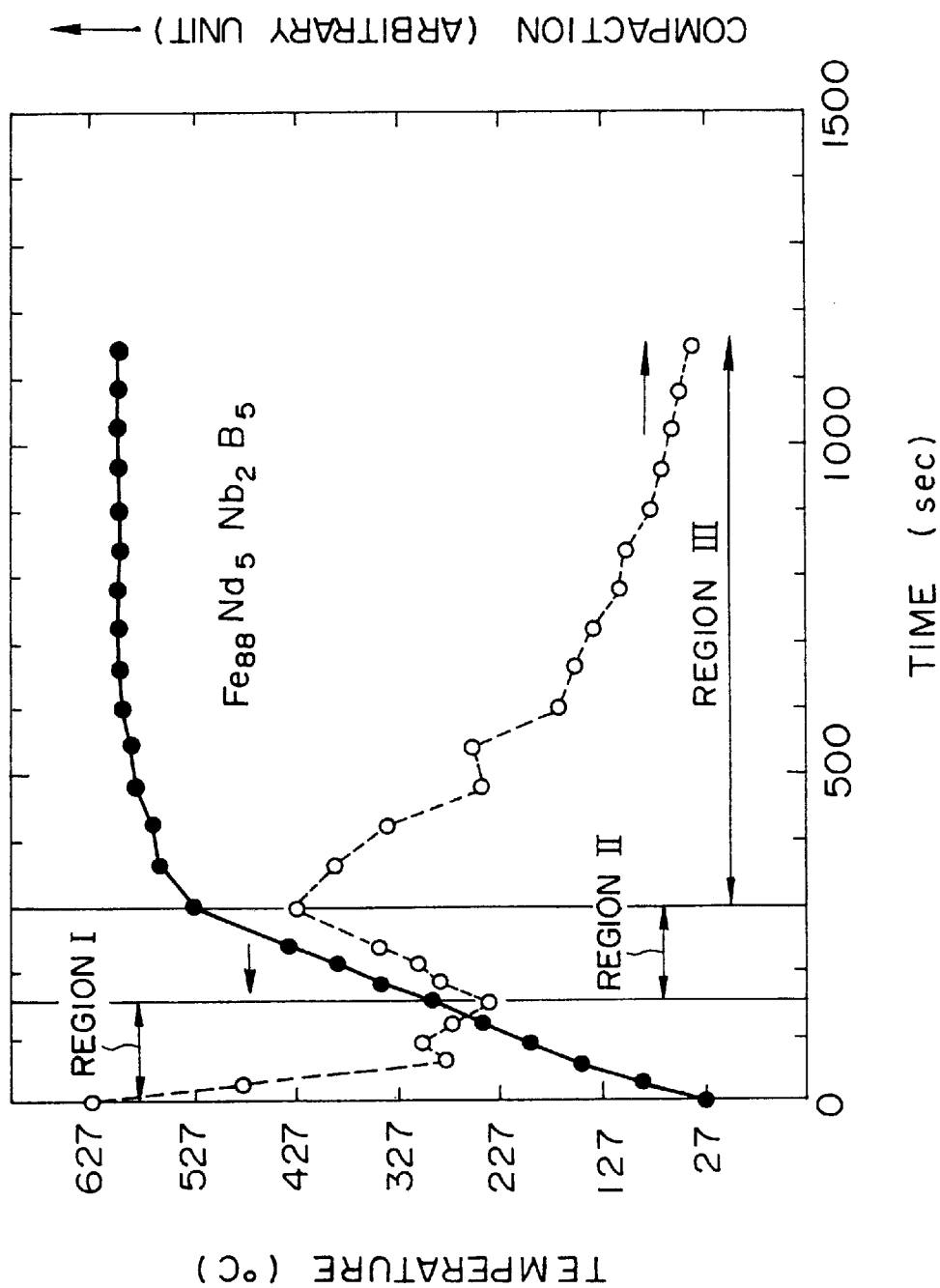
FIG. 13 shows changes in temperature and compaction of compact samples of the present invention with time elapse during sintering.

FIG. 12 ($Fe_{86}Nd_7Nb_2B_5$) and FIG. 13 ($Fe_{88}Nd_5Nb_2B_5$) show changes in temperature and compaction of the samples with time elapse during sintering. In the graphs, -●- and -○- indicate temperature change and compaction change, respectively. Compaction is defined such that when compaction increases, sample volume decreases.

It is apparent from FIGS. 12 and 13 that each sample temperature reaches the sintering temperature within approximately 500 sec., regardless of sample composition.

Compaction starts decreasing when temperature starts elevating (region I), then increases once when the temperature reaches approximately 327 to 427° C. (region II), and starts decreasing again (region III). The above reduction in compaction observed in the regions I and III, that is, a rise in sample volume, is attributed to thermal expansion of the samples and die. The samples are supposed to soften and sinter in the region II because compaction increases in this region.

Figure 14:
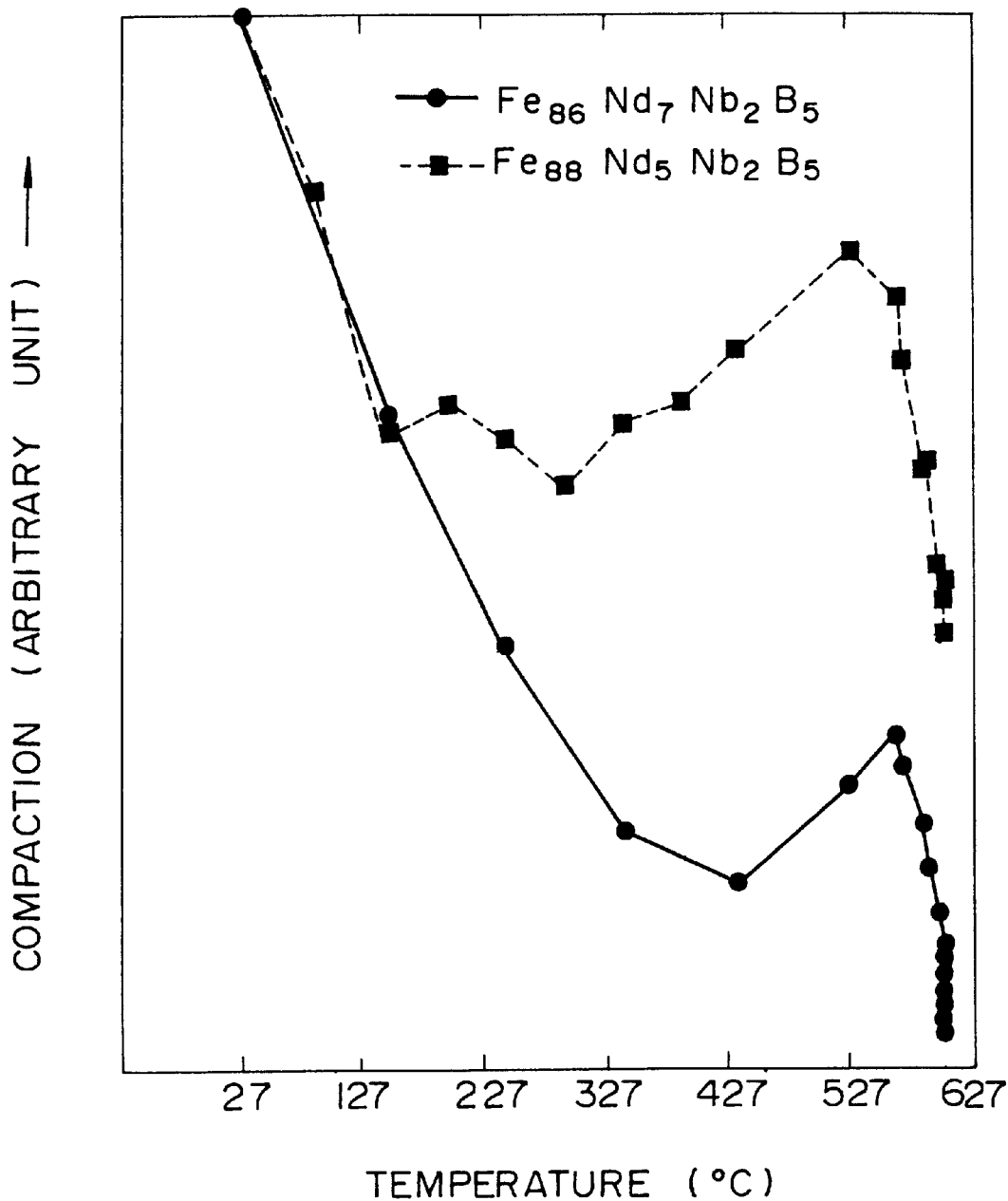
FIG. 14 shows changes in temperature and compaction of compact samples of the present invention during sintering.

FIG. 14 shows the relationship between sample temperature and compaction. Compaction increases when the sample temperature ranges from approximately 427 to 527° C. for the $Fe_{86}Nd_7Nb_2B_5$ alloy (indicated by -●-) and at approximately 327 to 527° C. for the $Fe_{88}Nd_5Nb_2B_5$ alloy (indicated by -■-). Therefore, it is understood that samples of both compositions soften and sinter at approximately 327 to 527° C., and in particular, the $Fe_{88}Nd_5Nb_2B_5$ alloy readily softens and sinters at a lower temperature as compared with the $Fe_{86}Nd_7Nb_2B_5$ alloy.

The density of the resulting compacts was in a range of 7.5 to 7.6 g/cm$^3$, which is almost the same as the specific density.

Figure 15:
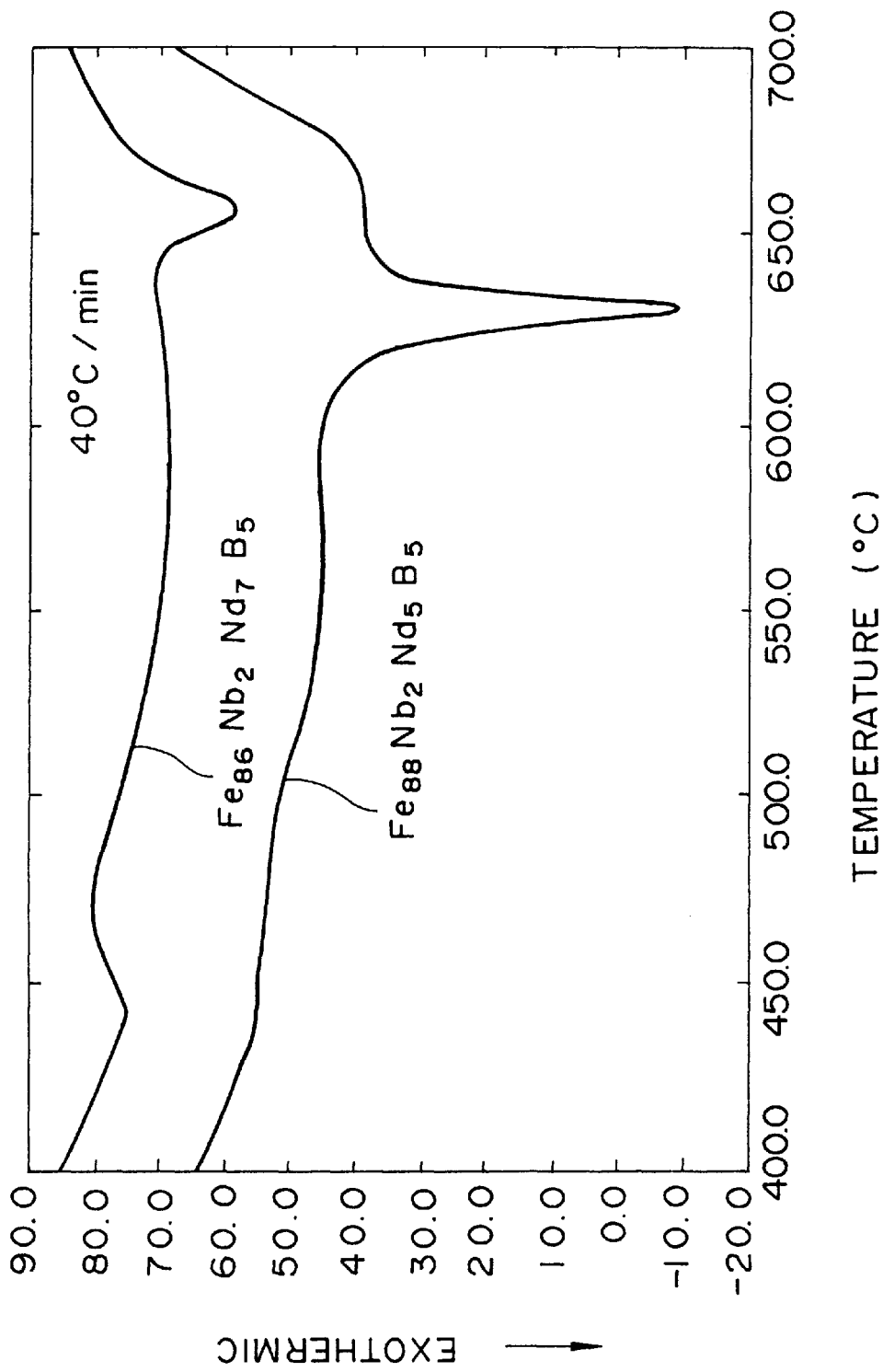
FIG. 15 shows the DSC curves for an amorphous alloy ribbons of the present invention.

FIG. 15 shows the DSC curves of amorphous alloy ribbons having compositions of $Fe_{88}Nd_5Nb_2B_5$ and $Fe_{86}Nd_7Nb_2B_5$, respectively. Temperature was elevated at a rate of 40° C./sec. Each alloy composition shows exothermic peaks corresponding to 2 to 3 crystallization steps. Although the precipitating order of phases in the Fe—Nd—Nb—B alloys is still unknown, it is expected that the $Fe_3B$ phase, bcc-Fe phase, and $Fe_{14}Nd_2B$ phase precipitate in that order when assuming that the precipitation order of the Fe—Nd—Nb—B alloys is similar to that of the Fe—Pr—Nb—B alloys.

In FIG. 15, the $Fe_{86}Nd_7Nb_2B_5$ alloy and the $Fe_{88}Nd_5Nb_2B_5$ alloy crystallize at approximately 650° C. and 610° C., respectively, which temperatures are higher than the softening temperatures shown in FIG. 14. Accordingly, these alloys supposedly start softening at temperatures lower than the crystallization temperatures. When a powder having a nano-crystalline structure due to heat treatment was sintered, a rise in compaction, as is shown in FIG. 14, was not observed and the density thereof was as low as 6.6 g/cm$^3$.

Figure 16:
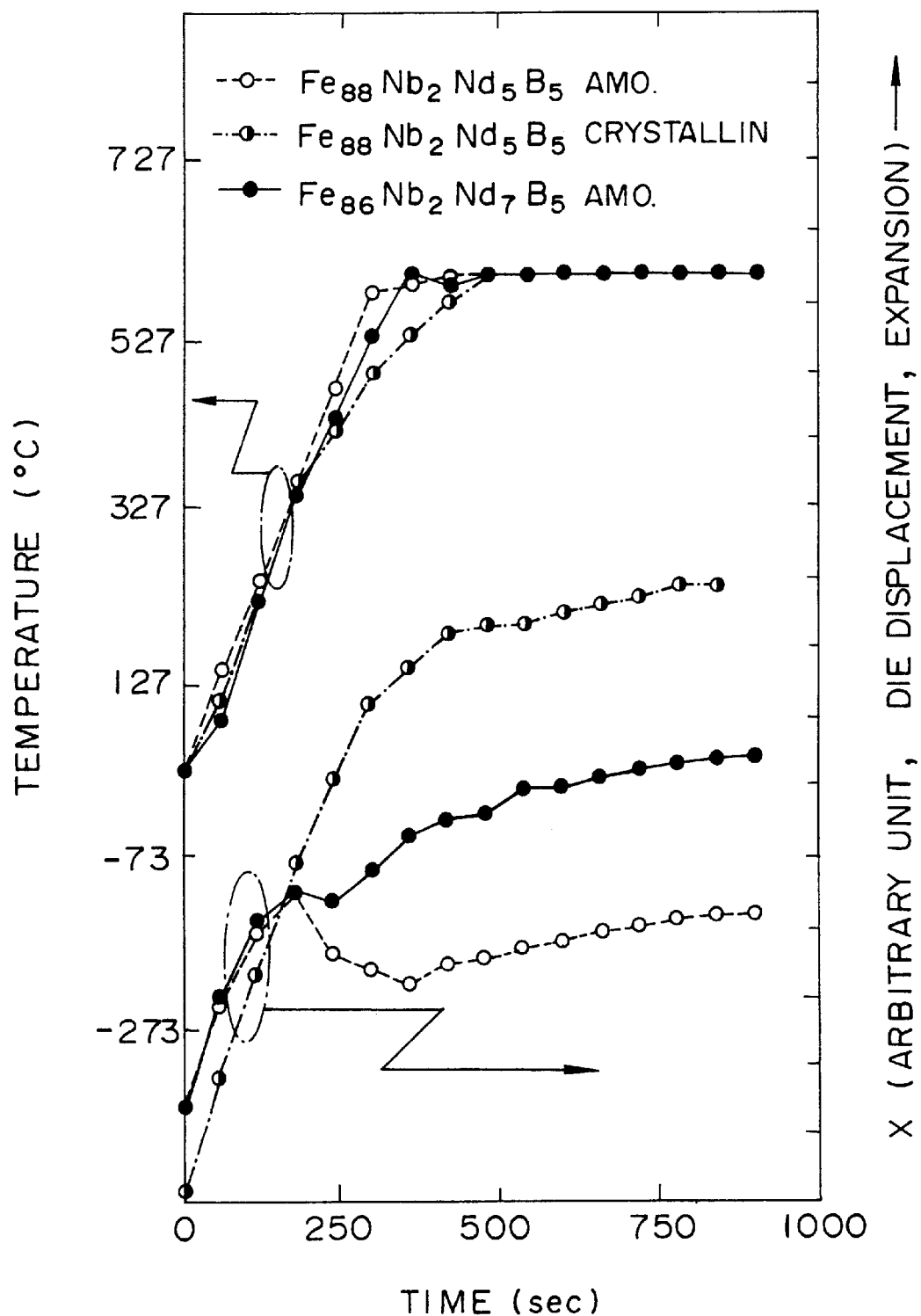
FIG. 16 shows the relationship between sintering time (sec), temperature, and expansion (die displacement) obtained by sintering $Fe_{88}Nd_5Nb_2B_5$ and $Fe_{86}Nd_7Nb_2B_5$ amorphous alloy powders and a crystallized powder prepared as a comparative example by heat-treating the $Fe_{88}Nd_5Nb_2B_5$ alloy.

FIG. 16 shows the relationship between sintering time (sec), temperature, and expansion (die displacement) obtained by sintering $Fe_{88}Nd_5Nb_2B_5$ and $Fe_{86}Nd_7Nb_2B_5$ amorphous alloy powders and a crystallized powder which was prepared as a comparative example by heat-treating the $Fe_{88}Nd_5Nb_2B_5$ alloy.

It is apparent from FIG. 16 that the $Fe_{88}Nd_5Nb_2B_5$ and the $Fe_{86}Nd_7Nb_2B_5$ amorphous alloy samples stop expanding or start shrinking at 350° C. at a sintering time of 240 sec., indicating that the samples soften and sinter at around 350° C. at the sintering time of 240 sec. Meanwhile, the crystallized $Fe_{88}Nd_5Nb_2B_5$ alloy sample softens and sinters at around 600° C. at a sintering time of 425 sec. It is thus revealed that an alloy in an amorphous state can sinter at a lower temperature within a shorter sintering time as compared with alloys being heated in a crystallized state.

Structural and Magnetic Characteristics of Compact

The resulting $Fe_{86}Nd_7Nb_2B_5$ and $Fe_{88}Nd_5Nb_2B_5$ alloy compacts were processed into ring shapes and then subjected to heat treatment. The heat treatment was conducted in a vacuum at 750° C. for 180 sec. at a heating rate of 36° C./sec.

Figure 17:
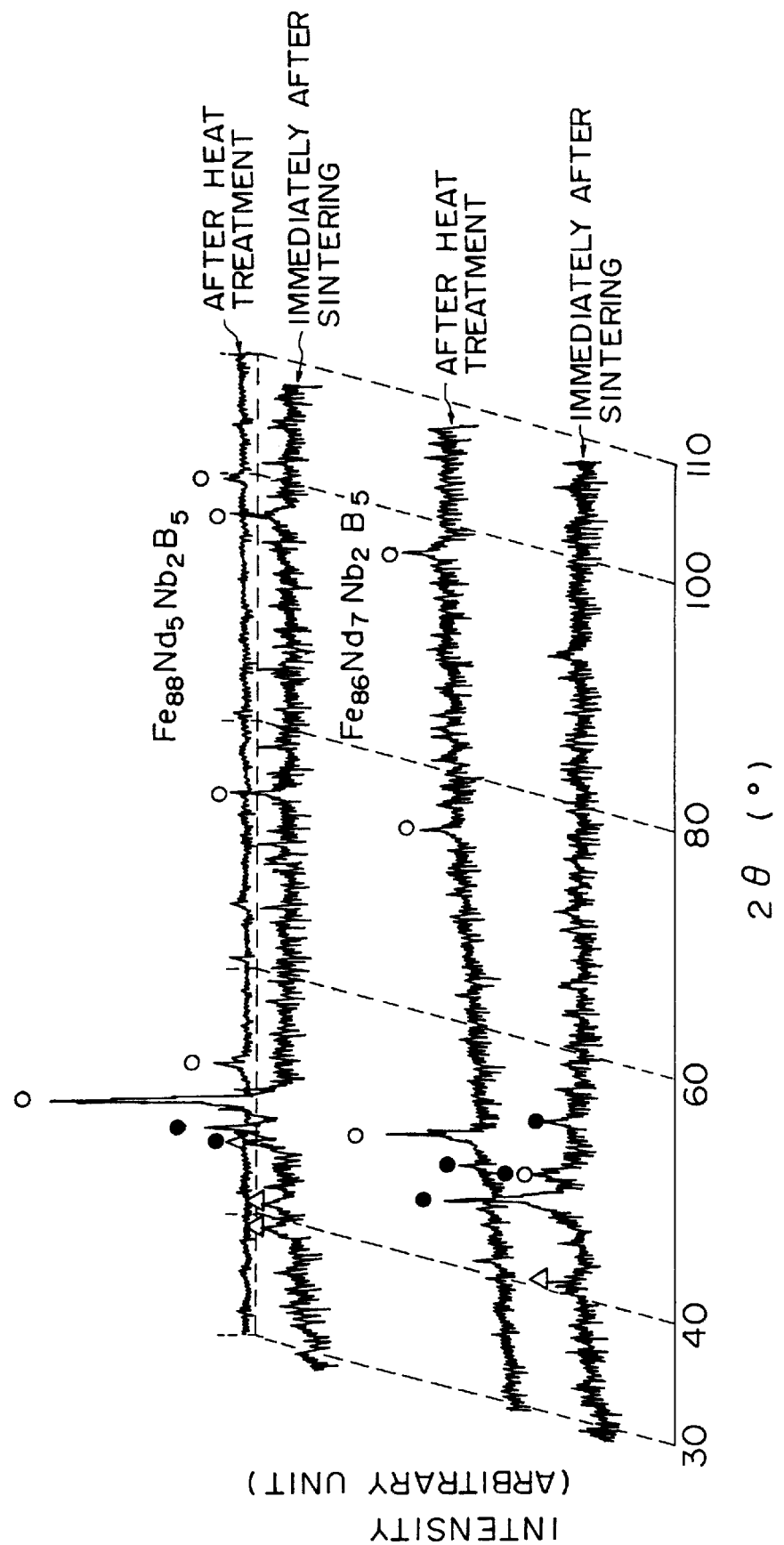
FIG. 17 shows X-ray diffraction patterns of compact samples of the present invention.

FIG. 17 shows X-ray diffraction patterns of the $Fe_{86}Nd_7Nb_2B_5$ and the $Fe_{88}Nd_5Nb_2B_5$ alloy compacts measured immediately after sintering and after heat treatment.

In both patterns obtained immediately after sintering and after heat treatment, each compact shows a diffraction peak corresponding to the bcc-Fe phase (indicated by ○), a diffraction peak corresponding to the $Fe_3B$ phase(indicated by ●), and a diffraction peak corresponding to the $Fe_{14}Nd_2B$ phase(indicated by △), which means that a mixture of these phases is formed in the compacts.

Therefore, it is understood that these compacts have the bcc phase and the $Fe_{14}Nd_2B$ phase therein.

Figure 18:
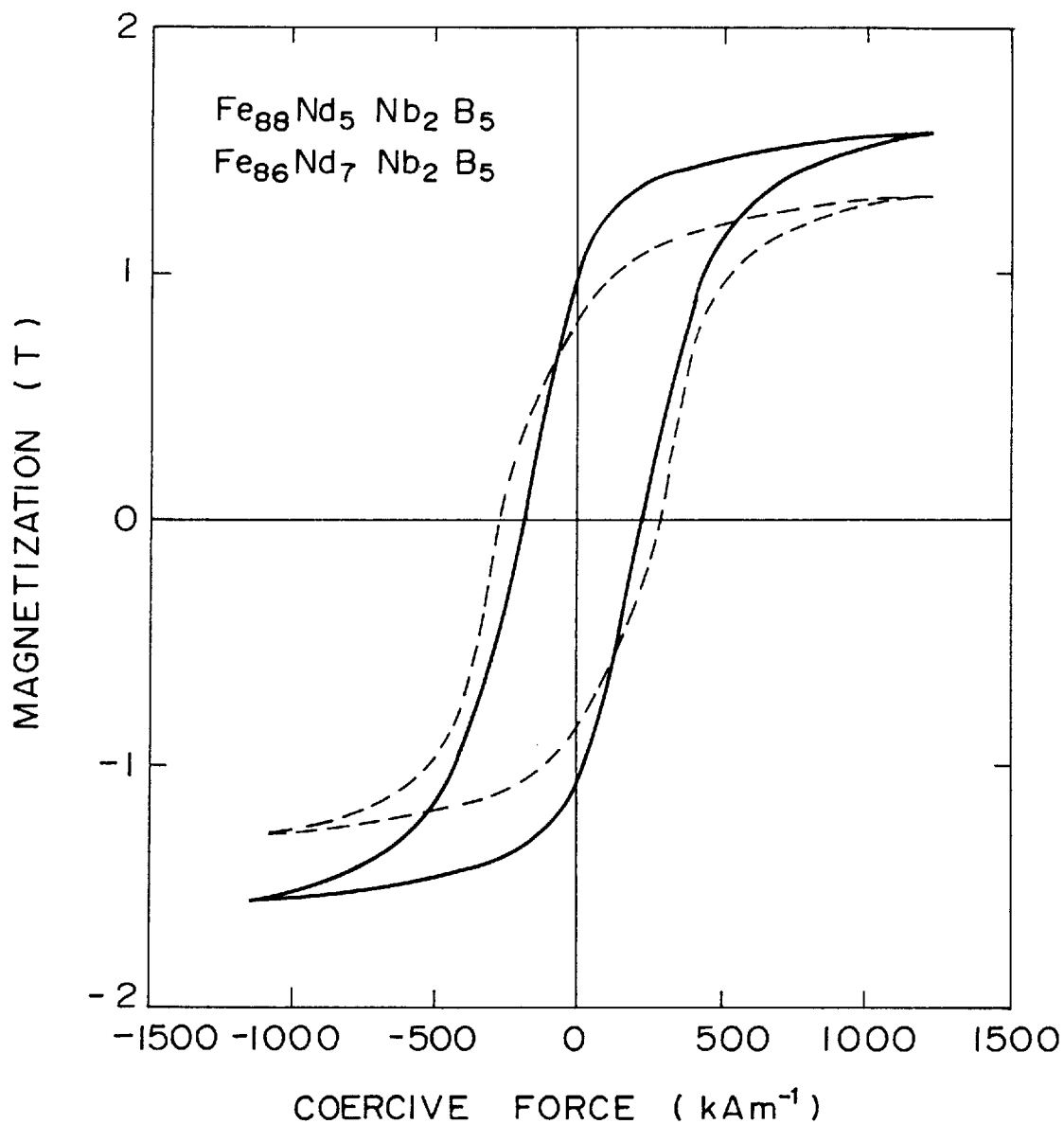
FIG. 18 shows the magnetization curves for compact samples of the present invention.

FIG. 18 shows the magnetization curves of the sintered $Fe_{86}Nd_7Nb_2B_5$ and $Fe_{88}Nd_5Nb_2B_5$ alloy compacts. The solid lines and the dotted lines indicate magnetization of the $Fe_{88}Nd_5Nb_2B_5$ and the $Fe_{86}Nd_7Nb_2B_5$ alloy compacts, respectively. Similar to a single-phase magnetic material, the magnetization curve for each compact does not exhibit a spike or sudden change (i.e., is a smooth curve). Accordingly, it is understood that the resulting compacts have the exchange spring characteristics, i. e., characteristics exhibiting a magnetization curve similar to that of a single-phase hard magnetic material, due to magnetic coupling between a fine soft magnetic phase and a hard magnetic phase.

Moreover, the remanent magnetization Ir (T), remanence ratio (Ir/Is), coercive force iHc (kA/m), and maximum energy product (BH)max (kJ/m$^3$) of the $Fe_{86}Nd_7Nb_2B_5$ and the $Fe_{88}Nd_5Nb_2B_5$ alloy compacts were measured as the magnetic characteristics of the compacts. Table 2 shows the results.

TABLE 2

| | Alloy Composition | Ir (T) | Ir/Is | iHc (kA/m) | (BH)$_{max}$ (kJ/m$^3$) |
|---|---|---|---|---|---|
| Compact | $Fe_{88}Nd_5Nb_2B_5$ | 1.05 | 0.80 | 216 | 50 |
| | $Fe_{86}Nd_7Nb_2B_5$ | 0.85 | 0.63 | 285 | 50 |
| Ribbon | $Fe_{88}Nd_5Nb_2B_5$ | 1.23 | 0.78 | 212 | 97 |
| | $Fe_{86}NQ_7Nb_2B_5$ | 0.84 | 0.65 | 297 | 59 |

For comparison, magnetic characteristics of heat-treated amorphous alloy ribbons are shown in Table 2, which ribbons have compositions identical to either the $Fe_{86}Nd_7Nb_2B_5$ or the $Fe_{88}Nd_5Nb_2B_5$ alloy compacts. Heat treatment was conducted at 750° C., at which temperature the best hard magnetic characteristics were obtained.

It is apparent from Table 2 that each compact achieves almost the same coercive force iHc as that of the heat-treated amorphous alloy ribbons. The maximum energy product (BH)max values of the compacts are smaller than those of the ribbons, which fact is attributed to a reduction in the remanence ratio.

What is claimed is:

1. A method of producing a hard magnetic allow compact comprising a step of solidifying and molding a powdered alloy to form a compact such that a softening phenomenon occurs during formation of a crystalline phase, wherein said powdered alloy is pressed before said alloy is crystallized and during the occurrence of said softening phenomenon, wherein said powdered alloy comprises an amorphous phase, and wherein said crystalline phase exhibits hard magnetism.

2. A method of producing a hard magnetic alloy compact according to claim 1, wherein said powdered alloy has the following composition:

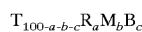

wherein T is at least one element selected from the group consisting of Fe, Co, and Ni;

wherein R is at least one element selected from the rare earth elements;

wherein M is at least one element selected from the group consisting of Ti, Zr, Hf, V, Nb, Ta, Mo, and W;

wherein B is boron;

wherein $4 \leq a \leq 20$, $0 \leq b \leq 10$, and $2 \leq c \leq 20$; and wherein a, b and c represent atomic %.

3. A method of producing a hard magnetic alloy compact according to claim 2, wherein M is at least one element selected from the group consisting of Zr, Hf, Nb, and Ta; and wherein $4 \leq a \leq 7$, $0.5 \leq b \leq 3$, and $3 \leq c \leq 7$.

4. A method of producing a hard magnetic alloy compact according to claim 2, wherein R is at least one element selected from Pr and Nd.

5. A method of producing a hard magnetic alloy compact according to claim 1, wherein said powdered alloy has a composition selected from the group consisting of $Fe_{88}Pr_7B_5$, $Fe_{86}Pr_7Nb_2B_5$, $Fe_{86}Nd_7Zr_2B_5$, $Fe_{86}Nd_9B_5$, $Fe_{84}Pr_{11}B_5$, $Fe_{88}Pr_5Nb_2B_5$, $Fe_{88}Nd_5Nb_2B_5$, $Fe_{86}Nd_7Nb_2B_5$, and $Fe_{89}Pr_4Nb_2B_5$.

6. A method of producing a hard magnetic alloy compact according to claim 1, further comprising the step of heat-treating said compact to develop said crystalline phase.

7. A method of producing a hard magnetic alloy compact according to claim 1, wherein 60% or more by weight of said compact comprises a fine crystalline phase having an average grain size of 100 nm or less with a remainder of said compact comprising an amorphous phase, and at least a bcc (body-centered cubic structure)-Fe phase and a $Fe_{14}R_2B$ phase are formed in said fine crystalline phase.

8. A method of producing a hard magnetic alloy compact according to claim 1, wherein a remanent magnetization of said compact is 100 emu/g or more.

9. A method of producing a hard magnetic alloy compact according to claim 1, wherein a ratio of a remanent magnetization to a saturation magnetization of said compact is 0.7 or more.

10. A method of producing a hard magnetic alloy compact comprising the steps of:

forming a powdered alloy;

heating said powdered alloy and pressing said powdered alloy while said powdered alloy has a temperature less than or equal to a crystallization temperature thereof to form a compact, wherein said pressing of said powdered alloy occurs during a softening phenomenon, wherein said powdered alloy comprises 50% or more by weight of an amorphous phase, and wherein said compact comprises a crystalline phase exhibiting hard magnetism.

11. A method of producing a hard magnetic alloy compact according to claim 10, wherein said powdered alloy has the following composition:

$$T_{100-a-b-c}R_aM_bB_c$$

wherein T is at least one element selected from the group consisting of Fe, Co, and Ni;

wherein R is at least one element selected from the rare earth elements;

wherein M is at least one element selected from the group consisting of Ti, Zr, Hf, V, Nb, Ta, Mo, and W;

wherein B is boron;

wherein $4 \leq a \leq 20$, $0 \leq b \leq 10$, and $2 \leq c \leq 20$; and wherein a, b and c represent atomic %.

12. A method of producing a hard magnetic alloy compact according to claim 11, wherein M is at least one element selected from the group consisting of Zr, Hf, Nb, and Ta; and wherein $4 \leq a \leq 7$, $0.5 \leq b \leq 3$, and $3 \leq c \leq 7$.

13. A method of producing a hard magnetic alloy compact according to claim 11, wherein R is at least one element selected from Pr and Nd.

14. A method of producing a hard magnetic alloy compact according to claim 10, wherein said powdered alloy has a composition selected from the group consisting of $Fe_{88}Pr_7B_5$, $Fe_{86}Pr_7Nb_2B_5$, $Fe_{86}Nd_7Zr_2B_5$, $Fe_{86}Nd_9B_5$, $Fe_{84}Pr_{11}B_5$, $Fe_{88}Pr_5Nb_2B_5$, $Fe_{88}Nd_5Nb_2B_5$, $Fe_{86}Nd_7Nb_2B_5$, and $Fe_{89}Pr_4Nb_2B_5$.

15. A method of producing a hard magnetic alloy compact according to claim 10, further comprising the step of heat-treating said compact to develop said crystalline phase.

16. A method of producing a hard magnetic alloy compact according to claim 10, wherein 60% or more by weight of said compact comprises a fine crystalline phase having an average grain size of 100 nm or less with a remainder of said compact comprising an amorphous phase, and at least a bcc (body-centered cubic structure)-Fe phase and a $Fe_{14}R_2B$ phase are formed in said fine crystalline phase.

17. A method of producing a hard magnetic alloy compact according to claim 10, wherein a remanent magnetization of said compact is 100 emu/g or more.

18. A method of producing a hard magnetic alloy compact according to claim 10, wherein a ratio of a remanent magnetization to a saturation magnetization of said compact is 0.7 or more.

19. A method for producing a hard magnetic alloy compact comprising:

preparing an alloy having an amorphous phase and exhibiting hard magnetism when crystallized;

pressing said alloy before said alloy is crystallized; and heating said alloy while continuing said pressing so that said alloy is compacted while in a temperature region inducing a softening phenomenon.

20. A method of producing a hard magnetic alloy compact according to claim 19, wherein said powdered alloy has the following composition:

$$T_{100-a-b-c}R_aM_bB_c$$

wherein T is at least one element selected from the group consisting of Fe, Co, and Ni;

wherein R is at least one element selected from the rare earth elements;

wherein M is at least one element selected from the group consisting of Ti, Zr, Hf, V, Nb, Ta, Mo, and W;

wherein B is boron;

wherein $4 \leq a \leq 20$, $0 \leq b \leq 10$, and $2 \leq c \leq 20$; and wherein a, b and c represent atomic %.

21. A method of producing a hard magnetic alloy compact according to claim 20, wherein M is at least one element selected from the group consisting of Zr, Hf, Nb, and Ta; and wherein $4 \leq a \leq 7$, $0.5 \leq b \leq 3$, and $3 \leq c \leq 7$.

22. A method of producing a hard magnetic alloy compact according to claim 20, wherein R is at least one element selected from the group consisting of Pr and Nd.

23. A method of producing a hard magnetic alloy compact according to claim 19, wherein said powdered alloy has a composition selected from the group consisting of $Fe_{88}Pr_7B_5$, $Fe_{86}Pr_7Nb_2B_5$, $Fe_{86}Nd_7Zr_2B_5$, $Fe_{86}Nd_9B_5$, $Fe_{84}Pr_{11}B_5$, $Fe88Pr_5Nb_2B_5$, $Fe_{88}Nd_5Nb_2B_5$, $Fe_{86}Nd_7Nb_2B_5$ and $Fe_{89}Pr_4Nb_2B_5$.

24. A method of producing a hard magnetic alloy compact according to claim 19, further comprising the step of heat treating said compact to develop said crystalline phase.

25. A method of producing a hard magnetic alloy compact according to claim 19, wherein 60% or more by weight of said compact comprises a fine crystalline phase having an average grain size of 100 nm or less with a remainder of said compact comprising an amorphous phase, and at least a bcc (body-centered cubic structure)-Fe phase and a $Fe_{14}R_2B$ phase are formed in said fine crystalline phase.

26. A method of producing a hard magnetic alloy compact according to claim 19, wherein a remanent magnetization of said compact is 100 emu/g or more.

27. A method of producing a hard magnetic alloy compact according to claim 19, wherein the ratio of a remanent magnetization to a saturation magnetization of said compact is 0.7 or more.

* * * * *